(12) United States Patent
Parsolano, III

(10) Patent No.: US 12,118,335 B2
(45) Date of Patent: *Oct. 15, 2024

(54) GUI GENERATION SYSTEM

(71) Applicant: Frank Parsolano, III, Vallejo, CA (US)

(72) Inventor: Frank Parsolano, III, Vallejo, CA (US)

(73) Assignee: Pixel Free Studio, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,023

(22) Filed: Oct. 5, 2023

(65) Prior Publication Data

US 2024/0184544 A1    Jun. 6, 2024

Related U.S. Application Data

(63) Continuation of application No. 15/894,910, filed on Feb. 12, 2018, now Pat. No. 11,816,459, which is a continuation-in-part of application No. 15/352,834, filed on Nov. 16, 2016, now abandoned.

(60) Provisional application No. 62/457,811, filed on Feb. 10, 2017.

(51) Int. Cl.
| | |
|---|---|
| *G06F 8/38* | (2018.01) |
| *G06F 8/34* | (2018.01) |
| *G06F 8/35* | (2018.01) |
| *G06F 9/54* | (2006.01) |

(52) U.S. Cl.
CPC .................. *G06F 8/38* (2013.01); *G06F 8/34* (2013.01); *G06F 8/35* (2013.01); *G06F 9/54* (2013.01)

(58) Field of Classification Search
CPC ..... G06F 8/34; G06F 8/35; G06F 8/38; G06F 9/54

See application file for complete search history.

(56) References Cited

U.S. PATENT DOCUMENTS

| | | | | |
|---|---|---|---|---|
| 7,243,334 | B1 * | 7/2007 | Berger | G06Q 40/12 717/109 |
| 7,716,634 | B2 * | 5/2010 | Ross | G06F 8/34 717/109 |
| 8,229,984 | B2 * | 7/2012 | Khader | G06F 8/20 725/112 |
| 8,484,554 | B2 * | 7/2013 | Noppens | G06T 11/206 705/7.18 |
| 8,856,650 | B1 * | 10/2014 | Off | A63F 13/33 715/764 |
| 10,331,423 | B1 * | 6/2019 | Parsolano | G06F 8/20 |
| 11,816,459 | B2 * | 11/2023 | Parsolano, III | G06F 8/34 |
| 2004/0153992 | A1 * | 8/2004 | Molina-Moreno | G06F 8/38 717/109 |

(Continued)

*Primary Examiner* — Douglas M Slachta
(74) *Attorney, Agent, or Firm* — PatentPC; Bao Tran

(57) ABSTRACT

Disclosed is a user interface (UI) Platform system for converting graphical user interface (GUI) design elements into API-integratable computer code (including native code) and logic, comprising a software tool, the software tool comprising a computer processor, a computer readable non-transitory storage medium coupled with the computer processor, and the computer readable non-transitory storage medium having a software algorithm adapted to accept at least a first graphic file representing at least a portion of a GUI defined for a known receiving device.

20 Claims, 5 Drawing Sheets

(56) References Cited

U.S. PATENT DOCUMENTS

| | | | |
|---|---|---|---|
| 2006/0020906 A1* | 1/2006 | Plut | G06F 1/3265 |
| | | | 715/867 |
| 2008/0127169 A1* | 5/2008 | Malasky | G06F 8/61 |
| | | | 717/174 |
| 2008/0201576 A1* | 8/2008 | Kitagawa | H04L 63/08 |
| | | | 713/168 |
| 2010/0115434 A1* | 5/2010 | Yagi | G06F 8/38 |
| | | | 715/810 |
| 2011/0320944 A1* | 12/2011 | Nikara | G06F 9/451 |
| | | | 715/716 |
| 2012/0284696 A1* | 11/2012 | Koskinen | G06F 11/3664 |
| | | | 717/126 |
| 2015/0193090 A1* | 7/2015 | Grover | G06F 9/451 |
| | | | 715/745 |
| 2016/0132301 A1* | 5/2016 | Riscutia | G06F 3/04886 |
| | | | 715/763 |
| 2016/0154673 A1* | 6/2016 | Morris | G06F 9/5027 |
| | | | 718/100 |
| 2017/0038932 A1* | 2/2017 | Schimmel | G06Q 10/063 |
| 2018/0260195 A1* | 9/2018 | Govindaraj | G06Q 30/0276 |
| 2018/0275971 A1* | 9/2018 | Parsolano, III | G06F 9/54 |

* cited by examiner

GUI GENERATION SYSTEM

CLAIM OF PRIORITY AND RELATED APPLICATIONS

This Patent Application claims priority from, and is a Continuation in Part of, pending U.S. patent application Ser. No. 15/352,834 filed on Nov. 16, 2016 entitled AUTOMATIC GRAPHICAL USER INTERFACE PROGRAMMING SYSTEM, to common inventor Frank Parsolano. This application is also related to and claims priority from U.S. Provisional Patent Application No. 62/457,811, filed on Feb. 10, 2017 also entitled SYSTEMS FOR CONVERTING GUI DESIGN ELEMENTS INTO NATIVE COMPUTER CODE AND LOGIC and having common inventor Arnie Foxx. The entire contents and substance of both Applications are hereby incorporated by reference in their entirety.

TECHNICAL FIELD OF THE INVENTION

The invention generally relates to computer software, and more particularly to providing a technology rooted solution to a technology-based problem via advanced Graphical User Interface (GUI) programming systems.

Problem Statement and History

Interpretation Considerations

This section describes technical field in detail and discusses problems encountered in the technical field. Therefore, statements in the section are not to be construed as prior art.

Discussion of History of the Problem

Since the advent of the first Application Programming Interface (API) and suites of tools to support software development, software programming has been segmented into a variety of distinct programming disciplines. In the Computer Arts it is well-known that software development generally encompasses individuals who specialize in one of: (1) front-end design (implemented by designers, or graphical artists), (2) back-end development (implemented by developers), and (3) data management (implemented by administrators, including database creation/management and API creation (which could be characterized as their own separate specialties).

The delineations are meaningful: millions of dollars have been spent creating (and, perhaps billions of dollars have been spent marketing) entire software products to address each one of these software needs, and these software products are often bundled based on the company that created and/or supports them (Adobe®, Microsoft®, or RedHat®, for example) so that each company's back-end product will be compatible with their own back-end solutions. This bundling also makes sense because practically every software product has a front end, a back end, and uses data, so every company that develops software needs all three (and often other) compatible solutions.

Other authors have attempted to address this problem, however unsatisfactorily, by, for example:

- discussing an integrated development environment with a resource adapter for computer system to assist in development of business applications;
- discussing a web service for developing internet applications by connecting remote computing devices to an intermediary server for web services through a single, secure and access-controlled network;
- discussing an online development environment server with virtual operation spaces and view managers that bind users and views of virtual development environment through virtual development environment and virtual resource pool managers; and
- discussing a device-independent user interface framework and a code generation tool for providing fast development of multiplatform and adaptive applications according to device and platform features.

However, the problem of creating software programs that are design-driven and maintain multi-platform operability persist, and has led to, over time, large and expensive front-end and back-end software products. For example, the price for a single license of the Microsoft® development platform Visual Studio® in 2013 exceeded $4,200 per seat (or, user), and licensing its programs separately cost much, much more. Further, these independent products (from whatever company makes them) are the creation of independent, massive development teams, thus leading to compatibility issues within single platforms. Accordingly, there is a need for a single integrated front design and back end development solution that overcomes the disadvantages of existing programming tools, and the present invention is the solution.

BRIEF DESCRIPTION OF THE DRAWINGS

Various aspects of the invention and its embodiment are better understood by referring to the following detailed description. To understand the invention, the detailed description should be read in conjunction with the drawings, in which.

DESCRIPTION OF AN EXEMPLARY PREFERRED EMBODIMENT

Interpretation Considerations

Figure 1:
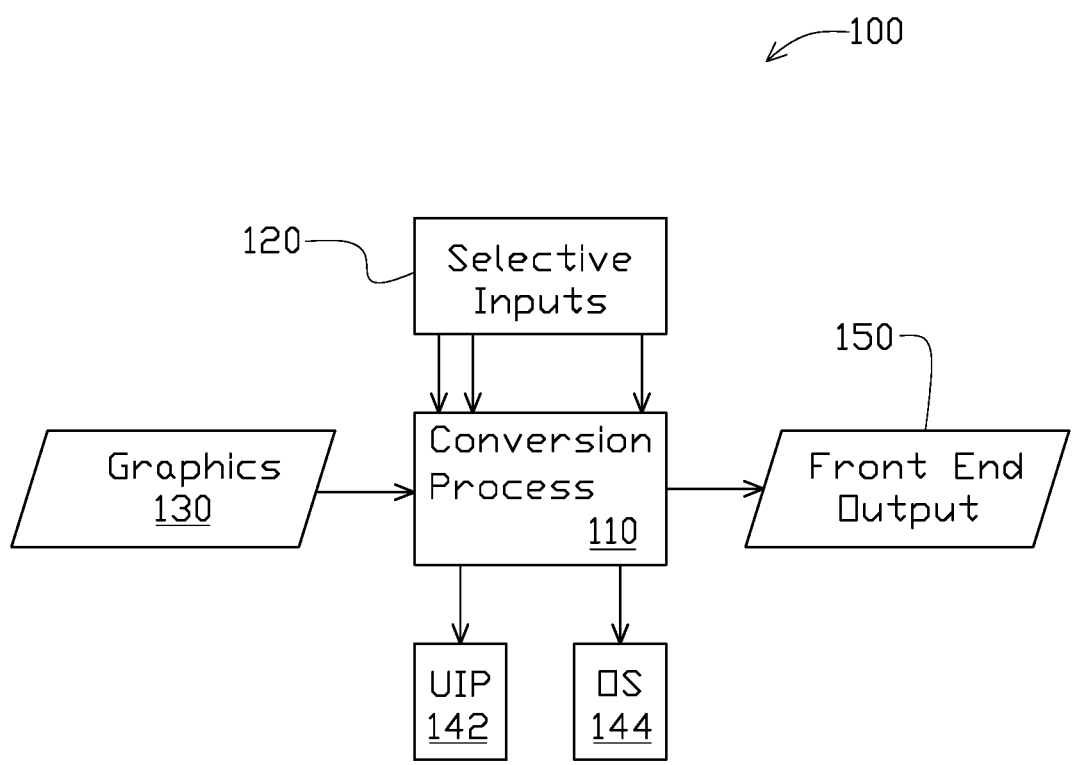
FIG. 1 shows an inventive functional model for a graphical user interface programming system.

While reading this section (An Exemplary Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, sheet drying may be performed through dry or wet heat application, or by using microwaves. Therefore, the use of the word "paper drying" invokes "dry heating" or "wet heating" and all other modes of this word and similar words such as "pressure heating".

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated.

The foregoing discussions and definitions are provided for clarification purposes and are not limiting. Words and phrases are to be accorded their ordinary, plain meaning, unless indicated otherwise.

DESCRIPTION OF THE DRAWINGS, A PREFERRED EMBODIMENT

Introduction

The inventive User Interface (UI) Platform allows a user to use layout and control graphics from a multitude of popular commercial tools, such as Microsoft Visual Studio®, Android Studio®, XCode®, Borland® and others, importing them into the UI Platform and modifying and tailoring the graphics as if they were an organic capability of the tool. The UI Platform eliminates the need for a middle-man framework because it directly generates the language specific code for the user interface (this is valid for both layouts and controls). This greatly improves performance by eliminating previously needed frameworks which consumed battery power, CPU usage, memory, and performance. The UI Platform has a graphics design capability which provides additional advantages apparent to those of ordinary skill in the software programming arts. Accordingly, from a developer-user point of view, the UI Platform provides a cross-language layout/cross-language control system (also called a User Interface Code Converter).

Selected Glossary

Animation—animation of graphics and controls can be linked to the numerical values assigned in the PFS Tool and thus can be varied, controlled, or animated by a time line.

States—The UI Platform allows the user to assign various states, such as static, hover, active, focus or disabled to any graphic or part of the graphic. For example, one or any of the above states can be assigned to a button, its border, any its corners, etc.

Audio Controls—include on/off, fade-in/fade-out, and volume control.

Video Control—include start/stop, loop, and fade-in and fade-out.

DESCRIPTION OF A PREFERRED EMBODIMENT

FIG. 1 shows an inventive functional model 100 for a graphical user interface programming system. The functional model 100 is anchored by a conversion process 110 that converts a variety of inputs (120-142, described next) into a front end output 150. For example, selective inputs 120, such as cross-language control states, cross-language layouts, audio/video (A/V) controls, or animations, for example, may be accepted by the conversion process 110. Similarly, user-defined graphics 130 (such as vector or bitmap graphics, for example) may be provided in forms such as buttons, photographs, animations or movies to the conversion process 110. Additionally, the conversion process 110 is adapted to also receive inputs from the UI Platform 142 and an operating system 144, such as a MacOS®, Windows®, or Linux®, for example. The font end output 150 is code adaptable for use by any Graphical User Interface (GUI)-based environment.

Figure 2:
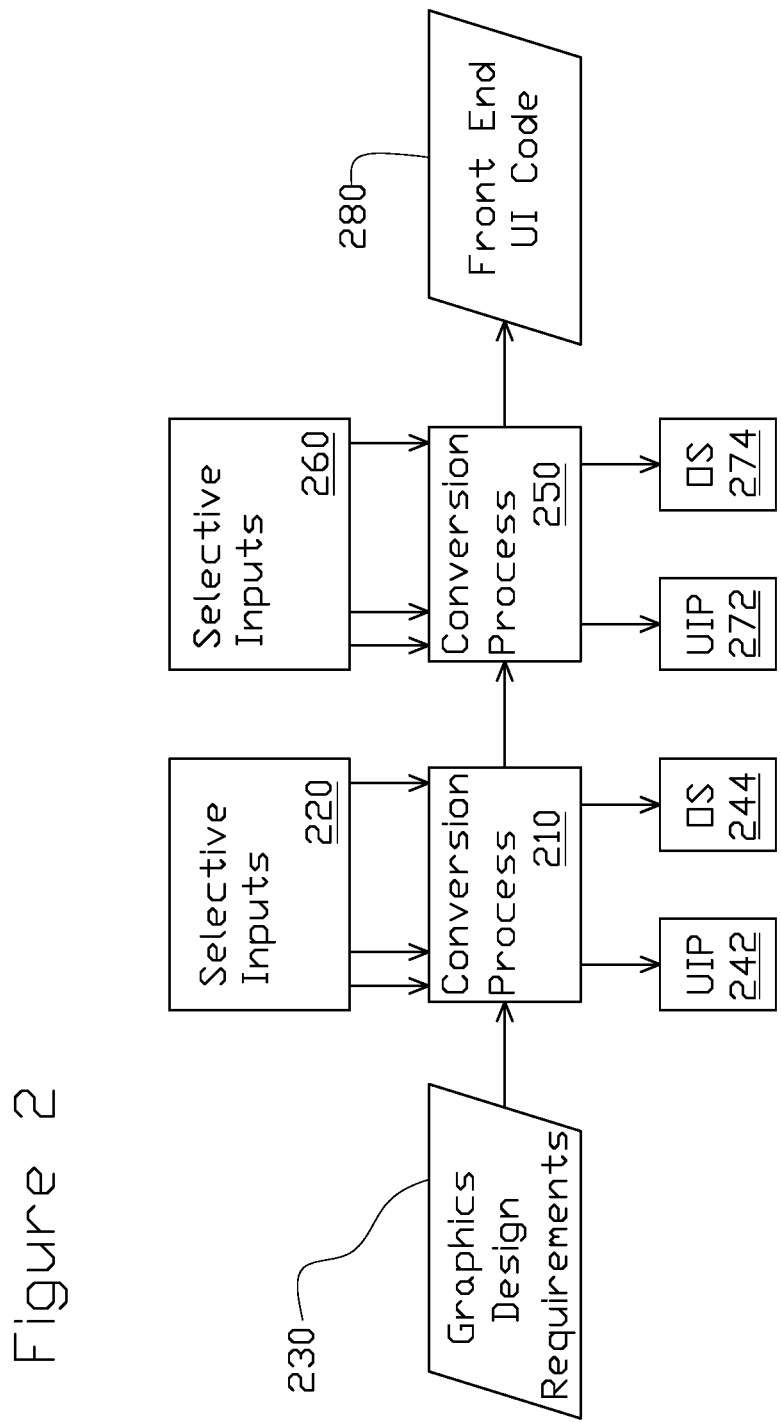
FIG. 2 shows an alternative inventive functional model for a graphical user interface programming system.

FIG. 2 shows an alternative inventive functional model 200 for a graphical user interface programming system implemented in two processes: a design process 210 and a conversion process 250. The shown alternative functional model 200 achieves ease of use via the design process 210 that converts a variety of inputs (220-244) into user defined graphics and A/V output for the conversion process 250. For example, selective inputs 220, such as cross-language control states, cross-language layouts, audio/video (A/V) controls, or animations, for example, may be accepted by the design process 210. Similarly, user graphics design requirements 230 (such as vector or bitmap graphics, for example) may be provided to the design process 210. Additionally, the design process 210 is adapted to also receive inputs from the UI Platform 242 and an operating system 244, such as a MacOS®, Windows®, or Linux®, for example. The output of the design process includes graphics, audio and video adaptable for use by the conversion process 250.

The ease of use of the design process 210 is augmented by the conversion process 250 that converts a variety of inputs into a front end U/I Code 280. For example, selective inputs 260, such as cross-language control states, cross-language layouts, audio/video (A/V) controls, or animations, for example, may be accepted by the conversion process 250. Similarly, user-defined graphics (such as vector or bitmap graphics, for example) and A/V may be provided from the design process 210. Additionally, the conversion process 250 is adapted to also receive inputs from a UI Platform 272 (which may be substantially similar to or different from the UI Platform 242) and an operating system 274 (which may likewise be substantially similar to or different from the operating system 244), such as a MacOS®, Windows®, or Linux®, for example. The output of the font end UI Code 280 is code adaptable for use by any Graphical User Interface (GUI)-based environment.

Figure 3:
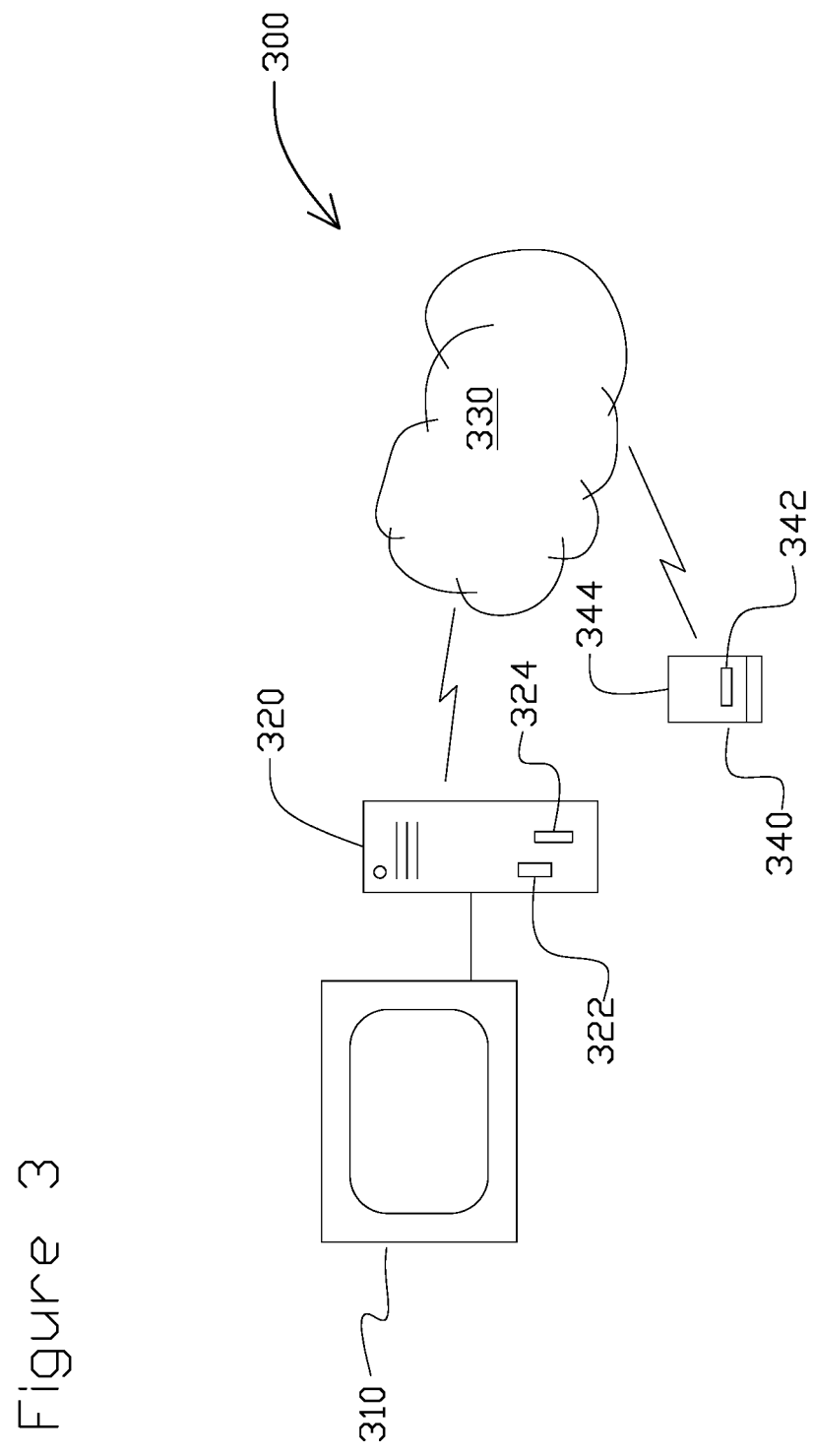
FIG. 3 shows a schematic representation of one inventive system according to the invention.

FIG. 3 shows a schematic representation of one inventive system 300 according to the invention. The system 300 is an automatic graphical user interface programming system that greatly reduces computer processor time and power usage including. In one embodiment, the system 300 comprises a computer processor 322; computer readable non-transitory storage medium 324 having a software algorithm stored thereon, whereby the software algorithm is designed to accept graphic files representing at least a portion of a graphic user interface for a computing device application. The software algorithm is further adapted to accept at least one of the following definitions for inclusion in a graphical user interface: (A) button descriptions/buttons, B) photographs, C) animations, D) movies, E) a story board for the path a user can follow through the graphical user interface, F) tables for displaying information, or G) a timeline for the actions and activity of the graphical user interface.

When a timeline is an input, the software algorithm further accepts information describing the intended receiving computing device 340 that the graphical user interface will ultimately be used on. Here, the software algorithm preferably comprises at least three templates for software code that describes/defines a graphical user interface in the native code environment of the receiving computing device 340. In this procedure the software algorithm recursively compares the input information regarding the desired graphical user interface with the relevant templates to choose the template that closest represents the features of the information input to describe the desired graphical user interface (the "best fit template"). Next, the software algorithm further alters the recursively-selected template to match at least one of sizing, colors, position, layout, and function of the input information describing the desired graphical user interface.

The software algorithm is preferably adapted to complete many activities traditionally performed separately. For example, the software compiles source code files in the code environment native to the receiving computing device 340, where the source code files are adapted to provide a graphical user interface for an application on the receiving computing device 340. Notice that the software code is executed by the processor 322 (it is anticipated that the processor's 322 time and power usage are reduced by at least ten percent by the software algorithm compared to other traditional methods for producing graphical user interface source code files in the native code environment of the receiving computing device). In one embodiment, the receiving computing device 340 receives transferred output software code from the processor 322.

A software algorithm (such as an algorithm 400, discussed in detail below) is at least partially stored on computer readable non-transitory storage medium 324 coupled in communication with a computer processor 322, where the computer processor 322 runs the software algorithm. The software algorithm accepts at least one graphic file representing at least a portion of an intended graphical user interface for a computing device application. In one embodiment, the software algorithm may accept at least one of a Photoshop® file, a vector graphic file, and a similar graphic file.

The software algorithm preferably parses the graphic file, including:
 parsing separate elements of the graphic file,
 parsing different layers of the graphic file,
 parsing separate zones of the graphic file, or
 parsing any suitable combination of these components.

The software algorithm also accepts information describing the receiving computing device. This information may include a device manufacturer, a device model, a type and a version of the operating system on the receiving computing device 340, or any other suitable information that describes the native code environment on the receiving computing device 340. The software algorithm preferably recursively selects from a plurality of (and preferably at least three) templates for software code describing at least one portion of a graphical user interface in a native code language, where the templates are preferably relevant to the native code environment on the receiving computing device 340, and where the purpose of the recursion is to select the template that most closely matches the graphic input file as well as the additional input information.

This allows the software algorithm to have a code structure for at least one portion of the graphical user interface in the appropriate native code environment, which can then be modified and refined to appropriately represent the input graphic file (and any other input information) and to do so in the native code environment for the receiving computing device 340. In one embodiment, where multiple pages, multiple variations, and multiple portions of the graphical user interface are input into the software algorithm, this process may be repeated for each of multiple pages, multiple variations, and multiple portions of the graphical user interface. The software algorithm preferably selects a template to match at least one of sizing, colors, position, layout, and function of the information that was input into the software algorithm to describe the desired graphical user interface.

In one embodiment, the software algorithm selects from at least two native code templates related to features of a graphical user interface include code templates related to at least one of buttons, text areas, animations, photographs, movies, text entry fields, interfaces with backend application code. Here, the software algorithm preferably selects the appropriate feature template for at least one of the features in at least one of the at least one input graphic file and additional input information describing the intended graphical user interface. As an example, if a button is described by at least one of the input graphic files (and the additional input information), the software algorithm selects from at least two button templates describing buttons in the native source code environment of the receiving computing device 340, and picks the template most closely depicting the button matching the input information.

This selection process can be applied to any feature in the input graphic file, or the corresponding additional input information. In this variation, the software algorithm modifies the code of the feature template to most closely represent at least one of the input graphic and input information for that feature, as well as to ensure that feature appropriately interfaces with any required backend application information and code. This process may be repeated for all relevant features if necessary.

Figure 4:
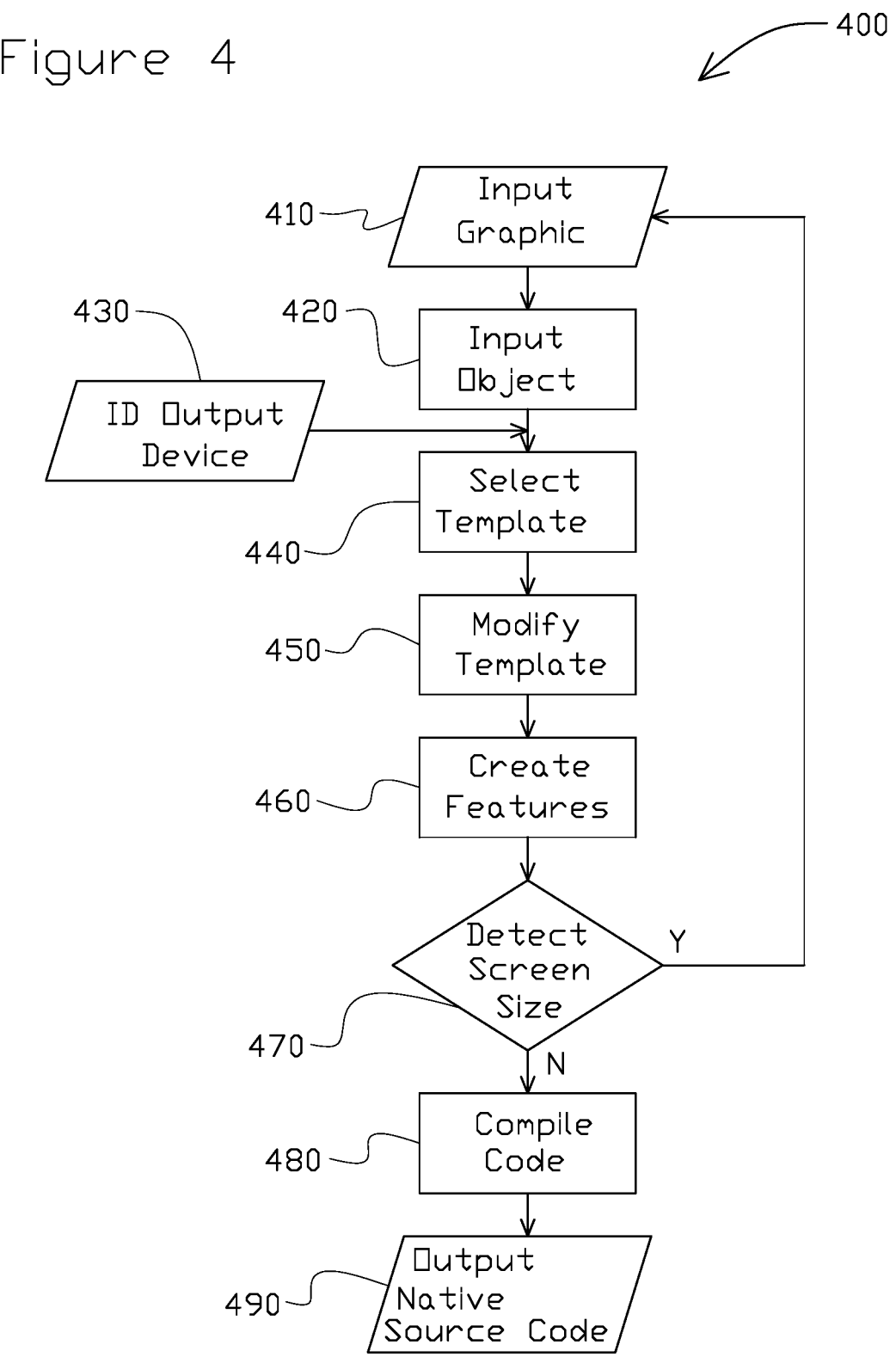
FIG. 4 shows an algorithm for design-driven programming having platform independent functionality.

FIG. 4 shows an algorithm 400 for design-driven programming having platform independent functionality. With simultaneous reference to FIG. 3, the algorithm 400 begins with a input graphic act 410 whereby the algorithm 400 receives an input of a graphic file representing at least a portion of a GUI. Next, in an input object act 420, the algorithm accepts an object as input to be part of the GUI. Objects include, for example, (A) button descriptions/buttons, B) photographs, C) animations, D) movies, E) a story board for the path a user can follow through the graphical user interface, F) tables for displaying information, or G) a timeline for the actions and activity of the graphical user interface. Additionally, the algorithm 400 receives, in an ID Output Device act 430, input information describing the intended receiving computing device. Accordingly, in one embodiment the software algorithm may include a "listener" in the output source code to detect the screen size 344 on the receiving computing device 340, where the output graphical interface source code chooses from between at least two versions of the graphical user interface based on the detected screen size 344 on the receiving computing device 340 (described below).

In this embodiment, at least two versions of layouts exist for at least one portion of the GUI, and these are input to the software algorithm 400 in the ID Output Device Act 430. Accordingly, the software algorithm 400 next proceeds to a select template act 440. In the select template act 440, the algorithm 400 develops native source code for each of at least two layouts to generate at least two separate segments of native source code for two corresponding layouts of the GUI. Accordingly, when the screen size 344 of the receiving device 340 is detected, the algorithm 400 then selects and loads the appropriate native source code segment for the layout that best suits the detected screen size 344. This allows the algorithm 400 to create a GUI adaptive to devices with different screen sizes (and to altogether different devices) as described below. Turning back to the present state of the algorithm 400, next the algorithm 400 modifies the selected template code to match the input graphics and information in a modify template act 450. Then, in a create features act 460, the algorithm 400 creates features within the input graphics and information by selecting between a plurality of templates describing features for the objects (A)-(G), for example, above.

Next, in a detect screen size query 470, the algorithm 400 determines if different layouts were input for different screen sizes. If so, as illustrated by the "Y" path, the algorithm 400 uses a listener code via the output native code to detect the screen size 344 of the receiving (aka target) computing device 340, and then proceeds to return to the input graphic act 410 whereupon the algorithm 400 is repeated once for each layout. If only one screen layout is used, as illustrated by the "N" path, the algorithm 400 proceeds to a compile code act 480, whereby the template files, including code native to the receiving computing device, is compiled for the receiving computing device 340. Next, in an output native source code act 490 native source code is sent/output for the GUI of the receiving device, whereby the output native source code may be sent to the receiving device 340. In a one embodiment, the native source code is exported and combined with the back-end application source code and the entire native source code application is transferred to the receiving computing device 340.

EMBODIMENT ALTERNATIVES

In one embodiment, additional input information may include a user interface tree. Here, the software algorithm 400 parses the user interface tree, then:

recursively selects the appropriate templates for each portion of the tree, modifies those templates to create output native source code, selects feature-based templates 11 for any relevant features, modifies those feature-based templates 11, and updates the overall templates with the adjusted feature-based native source code.

This creates a more-complete graphical user interface code in the native source code appropriate for the receiving computing device 340. Upon reading this disclosure, other variation and processes for achieving substantially similar results are apparent to those of ordinary skill in the software programming arts.

Figure 5:
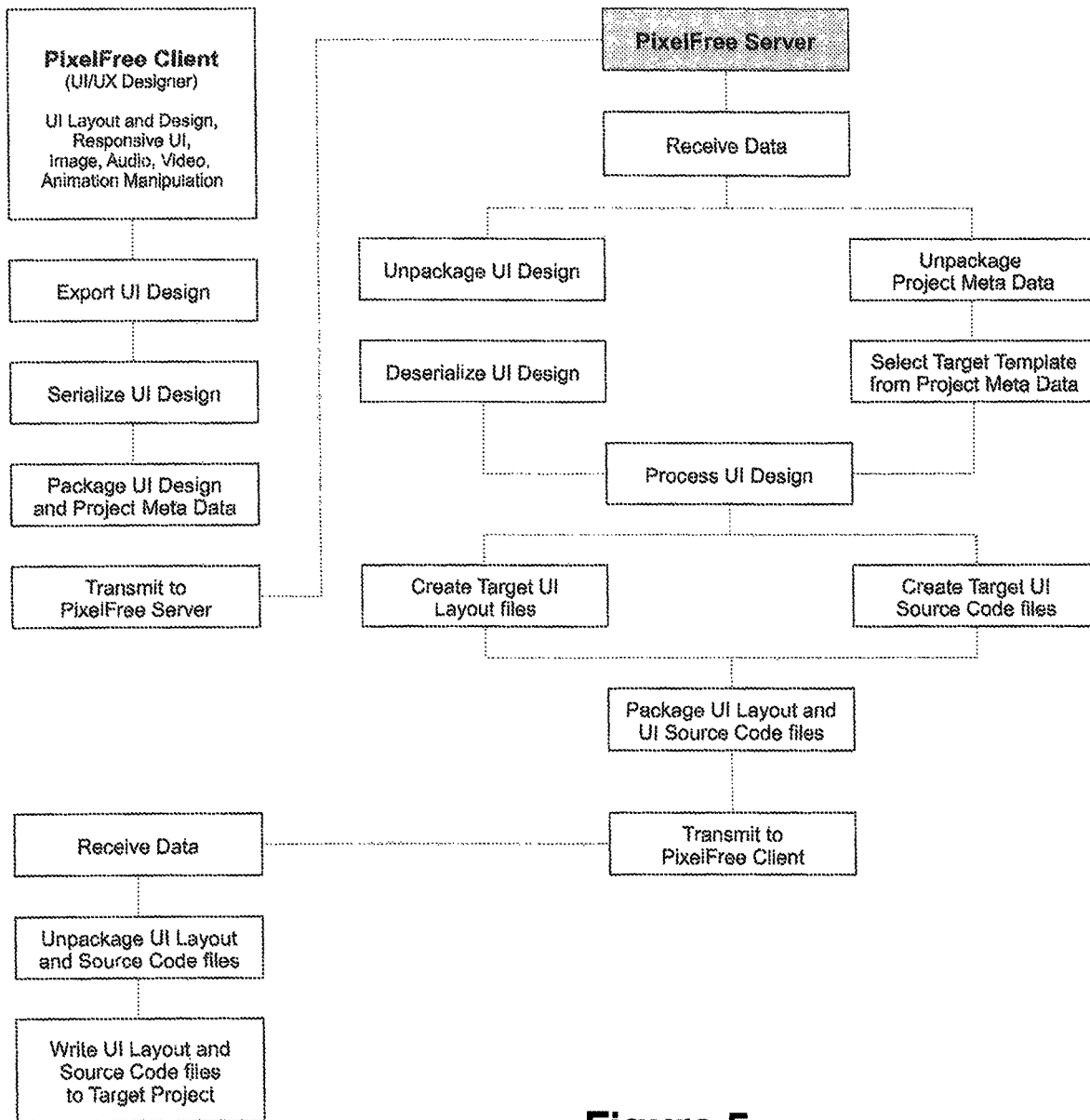
FIG. 5 shows an over-arching architecture of and flow for one programming system according to the teachings of the invention.

In one alternative alternative, at least a portion of the software algorithm may be executed on a remote computing server with at least one additional processor and at least one additional computer readable non-transitory storage medium, such as those located in cloud computing (for example, via PixelFree Server, Receive Data, Unpackage UI Design–Deserialize UI Design/Unpackage Project Metadata–Select Target Template from Project Metadata, Process UI Design, Create Target UI Layout Files/Create Target UI Source Code Files, Package UI Layout and UI Source Code Files, Transmit to PixelFree Client of FIG. 5, below). In this embodiment, an additional alternative is to use a local and cloud-based computing processors to executing the software algorithm 400 and thus collaborate to deliver the output native source code.

In an another alternative, elements including animations, movies, audio, pictures, buttons, and text input areas are described in the input graphic files and the additional input information. The software algorithm 400 then develops native source code for each of these elements that are included in the input graphic files (along with the additional input information). Upon reading this disclosure, other variation and processes for achieving substantially similar results are apparent to those of ordinary skill in the software programming arts.

Data Aware User Interface (UI) Components

FIG. 5 shows an over-arching architecture of and flow for one programming system according to the teachings of the invention, and the following forms a general description thereof. When developing software today, a UI screen is typically exported to a specific template before data integration begins on individual UI elements or UI Components. By contrast, the present invention completes data integration with UI elements in the developer's client machine via a UI Platform. This allows UI developers to map a UI element to a web service for real time data population of that UI element.

The PixelFree Client, shown in the PixelFree Client Box, is a UI Layout and Design tool that provides responsive UI, image, audio video and animation manipulation. When exported from the UI Platform (Export UI Design, Serialize UI Design, Package UI Design and Project Metadata, and Transmit to PixelFree Server), a web services connection code is generated for a template's native language and platform. For example, assume that a UI in the UI Platform comprises a standard List View known in the computer programming arts, that each row in the list view represents an item corresponding to a single data record, and that each data record may consist of one or more data fields. Furthermore, assume that the list view represents the results of a search for a "Coffee Shop" near the user who is performing the search.

Each item in the list view would represent a single coffee shop and could include relevant information such as: a thumbnail image of the coffee shop, the name of the coffee shop, the distance to the coffee shop, and a rating for the coffee shop. By allowing the List View to be connected via the UI Platform to the web service that provides this data, the programmer can see in real time what a user interface would look like on each target platform (or hardware device). Accordingly, the UI Platform simplifies the backend programming requirements because it produces code required to connect a UI element to the data it represents.

Programmable UI Components

The components created, designed, and manipulated in the UI Platform are called UI Components, or synonymously, Data Aware Components. One natural extension of Data Aware Components is the ability to attach programming logic to a UI object. Accordingly, each UI element can be programmed, and when exported, the UI and associated logic is converted by a template to a (sometimes) different programming language. In a preferred embodiment, the preferred programming language for the UI Platform/client is JavaScript.

For example, a calculator App that performs basic operations on positive integers is created. On the interface, there are 10 digits [0-9], five operations [+ − * / =], a clear function, and an input/output (I/O) alpha-numeric field, such as an LCD display, so a user can view what has been entered.

In the past before the UI Platform, a UI would have to be exported to a particular native platform before each UI element could be programmed to perform designated/desired operations by a programmer. However, using the UI Platform, that programmer is able to add code logic directly (such as with JavaScript).

Continuing with the example, the programmer enables each digit UI element to update the alpha-numeric field with the value the button represents. Accordingly, if a user presses the number "5", the number 5 appears on the alpha-numeric field. The programmer also implements logic for the operations: + − * /. Accordingly, a user may enter mathematical expressions such as 4+5*3. Then, the user could make the equals sign (=), a UI element created to be a Data Aware Component, that takes the entered information on the text field, sends it to a web service that performs the calculation, and then updates the alpha-numeric field UI with the result of that expression.

Accordingly, a programmer may now export a functional UI to any template and have an App that behaves substantially the same across various platforms using optimized native code for that platform. The benefits to productivity are readily apparent to those of skill in the computer programming arts.

Interactive, Streamable UIs

In the past, when a UI was exported from a client, it is transmitted to a server, converted to the language and platform dictated by a template, sent back to the requesting computer, and written to the target project's directory. The process is complete as the UI makes the entire round trip, and is represented as: client→server→client.

The UI Platform adds the capability to store UI objects in a Cloud environment (said Cloud being understood by those of skill in the computer programming arts). Here, a UI object can then be requested in the future. For example, at a requested time, the UI object converts through a template (as specified by the requesting client) and is then transmitted to the requesting client. In this scenario, the client that creates the UI object may be different from the client that requests the UI object.

This allows for unique features that are difficult to achieve using traditional approaches. For example, consider an App developer that wants to create a weather App for a Windows® platform. Using current methods, the App developer might initially create the App using the C# programming language. In this case, the UI is built directly using C#'s GUI library and tools, and the programming logic uses C#'s data structures and coding constructs. Once complete, the developer packages the App and releases it as an executable file through the Windows App Store®.

When a developer wants to create the same App for the MacOS platform, they use a different programming language (i.e. Swift) and different UI tools. The final App is then packaged and released through the MacOS App Store. If the developer wants to make an update to the UI, they must do so on two different platforms and then release two new versions of the software. End-users then update to the new version of the App to see the changes.

By contrast, with the UI Platform, the approach is simpler. The App developer/programmer creates the UI, and programs each UI element entirely from the UI Platform client. The UI and logic are then sent to and stored on the Cloud. At this point, the app developer creates a container (or shell) program for the Windows® platform (PixelFree Server, Receive Data, Unpackage UI Design−Deserialize UI Design/Unpackage Project Metadata−Select Target Template from Project Metadata, Process UI Design, Create Target UI Layout Files/Create Target UI Source Code Files, Package UI Layout and UI Source Code Files, Transmit to PixelFree Client). The shell program, at runtime, requests the UI from the Cloud based on which screen is being presented to the user. Before fulfilling the request, the Cloud service converts the UI objects to the requested template (C# and Windows) and then sends appropriate data, which may comprise visual data.

The Cloud also contains interactive elements as programming logic is originally attached during the creation process. When the developer wants to create the same weather App on a Mac® platform, they write the shell program for that platform, and request the same UI objects. The client request, in this case, specifies the template as Swift+MacOS so that code produced is native to the platform. Neither the UI, nor the programming logic is rewritten, because they are stored in a platform independent manner and converted to a native format at runtime.

Accordingly, when the app developer wants to make changes to the UI, they simply update the UI objects and logic stored in the Cloud. Thus, one advantage is that by using a unique serial ID, the shell programs on Windows and MacOS may detect that their UI's are out of sync with the latest locally-cached version and request the updated versions from the Cloud.

Thus, the developer pushes an update to the end-user without needing to rebuild, repackage, and upload the new version to the appropriate distribution platform (Windows App Store, MacOS App Store), and the user instantaneously receives UI updates without needing to do anything, including updating that App on their device. This is illustrated as Receive Data, Unpackage UI Layout and Source Code Files, and Write UI Layout and Source Code Files to Target Project. Accordingly, UI's are streamable and interactive across multiple platforms for which templates are available, greatly simplifying the native App development process. As an optimization, the Cloud caches compiled versions of the UI based on each template and serves future requests with that version (of course, until it is changed).

Advantageously, the UI Platform creates an environment of open collaboration among UI designers, enabling UI designers register as vendors on a Marketplace(s) where the UI designs and are available for free or for a fee. Third-party developers may then reuse those designs in their own Apps by requesting the UI via its identification (ID). For example, assume a UI designer creates an interactive and streamable Calendar design. Another App developer that is building a wedding planner App, may search a Marketplace for suitable calendar designs. Upon selecting the Calendar design developed, they simply code a shell App to request the design and provide the necessary data to ensure that it is functional for the needs of their App.

Selected Advantages

The UI Platform's interactive and streamable UIs, preferably using a template system, opens the door for creating content on proprietary and secure systems. Consider as an example the cable and television industry. With the UI Platform one can create dynamic television advertisements. Using built-in animation capabilities of the UI Platform, advertisers can create commercials and store each as a hosted UI object in the Cloud.

Similarly, television manufacturers may provide templates that define ways to utilize their software and hardware platform(s). The same advertisement may thus play on a multitude types of televisions, but unlike pre-existing television advertisements, the advertisement created by the UI Platform takes full advantage of each television's capabilities. Furthermore, by using UI objects, the amount of resources (data transfer bandwidth, and electricity, for example) consumed is substantially less than streaming in a pixel-based video format.

In the scope of military operations, the disclosed UI Platform Cloud approach to design and programming has advantages. The UI Platform's interactive and streamable UIs allow UI designers to create interfaces for a wide range of proprietary hardware used by the military. Accordingly, each template describes the software and hardware systems for a target platform. However, by designing the UI in the UI Platform and storing it in a base UI language, designers can target future (yet to exist) hardware platforms (and software). This allows designers and developers to reuse and standardize designs across generations of hardware and software, thus future-proofing the relevant technology infrastructure.

Although the invention has been described and illustrated with specific illustrative embodiments, it is not intended that the invention be limited to those illustrative embodiments. Those skilled in the art will recognize that variations and modifications can be made without departing from the spirit of the invention. Therefore, included within the invention are all such variations and departures that fall within the scope of the appended claims and equivalents thereof.

I claim:

1. A user interface (UI) Platform system comprising:
a computer processor; and
a computer readable non-transitory storage medium containing code executable by the processor, the code comprising:
code accepting at least a first graphic file representing at least a portion of the UI defined for a known receiving device and having a UI element associated with a first graphic file; and
a translation layer associating a function associated with the UI element including code generating a device native computer code by recursively selecting one or more templates for each portion in a tree data structure, modifying the one or more templates to create output native source code, selecting one or more feature-based templates for one or more predetermined features, and updating the one or more feature-based templates with the native source code and the UI element.

2. The UI platform system of claim 1 wherein the first graphic file is a graphical button.

3. The UI platform system of claim 1 wherein the first graphic file is a digital photograph.

4. The UI platform system of claim 1 wherein the first graphic file is a digital animation.

5. The UI platform system of claim 1 wherein the first graphic file is a digital movie.

6. The UI platform system of claim 1 wherein the first graphic file is a digital storyboard for a path a user can follow through a graphical user interface (GUI).

7. The UI platform system of claim 1 wherein the first graphic file is a digital table for displaying information.

8. The UI platform system of claim 1 wherein the first graphic file is a digital timeline.

9. The UI platform system of claim 8 wherein the processor:
accepts information describing a receiving computing device of a graphical user interface;
accesses a plurality of templates for software code describing a graphical user interface in a native code environment of the receiving computing device;
recursively compares input information regarding the graphical user interface with the plurality of templates to select a template having a fit to define a recursively selected template;
alters the recursively selected template to match input information describing a desired graphical user interface; and
compiles source code files in the code environment native to the receiving computing device.

10. The UI platform system of claim 9, wherein the source code files are adapted to provide a graphical user interface for an application on a receiving computing device, wherein the software code is executed by the processor.

11. The UI platform system of claim 1 wherein the processor detects at least one feature from input information regarding a desired graphical user interface, then recursively selects a native code template from at least two native code templates that describe graphical user interface features similar to the feature from the input information regarding the desired graphical user interface.

12. The UI platform system of claim 1 wherein a native code template related to a feature of a graphical user interface is related to at least one of buttons, text areas, animations, photographs, movies, text entry fields, or interfaces with backend application code.

13. The UI platform system of claim 1 wherein the processor detects at least one feature from input information regarding a desired graphical user interface, then recursively selects the native code template from at least two native code templates that describe graphical user interface features similar to the feature from the input information regarding the desired graphical user interface.

14. The UI platform system of claim 11 wherein the native code templates describing features of a graphical user interface include code templates related to at least one of buttons, text areas, animations, photographs, movies, text entry fields, or interfaces with backend application code.

15. The UI platform system of claim 11 wherein at least two separate native code source files are output by the source algorithm for separate receiving computing device screen sizes.

16. The UI platform system of claim 11 wherein at least two segments of native code are output by the source algorithm into the at least one native code source files, wherein one of the at least two segments of native code is adapted to properly display for separate receiving computing device screen sizes, wherein the native code source files include a listener that detects screen size usage and then uses the appropriate native code source file for the screen size.

17. The UI platform system of claim 11 wherein at least two separate native code source files are output by the source algorithm for separate receiving computing device screen sizes, wherein the native code source files include a listener that detects screen size usage and then uses the appropriate native code source file for the screen size.

18. The UI platform system of claim 11 wherein at least two segments of native code are output by the source algorithm into the at least one native code source files, wherein one of the at least two segments of native code is adapted to properly display for separate receiving computing device screen sizes, wherein the native code source files include a listener that detects screen size usage and then uses the appropriate native code source file for the screen size.

19. A user interface (UI) Platform system comprising:
a computer processor; and
a computer readable non-transitory storage medium coupled to the processor and containing:

a front end development software tool comprising at least a first UI element associated with a first function, a translation layer associating the function associated with the first UI element with a device native computer code associated with a first device, and a template that converts data of the first function into computer code that is native to the first device by recursively selecting one or more templates for each portion in a tree data structure, modifying the one or more templates to create output native source code, selecting one or more feature-based templates for one or more predetermined features, and updating the one or more feature-based templates with the native source code and the UI element.

20. The UI platform system of claim 1 or 19, comprising converting graphical user interface (GUI) design elements into application programming interface (API)-integratable computer code and logic.

* * * * *